United States Patent [19]
Othman

[11] Patent Number: 5,991,131
[45] Date of Patent: Nov. 23, 1999

[54] CASSETTE PLAYER APPARATUS FOR USE ON A BABY CRIB

[76] Inventor: Sana Mustafa Othman, 140 Amboy St., Dearborn Heights, Mich. 48127-6304

[21] Appl. No.: 08/920,769

[22] Filed: Aug. 29, 1997

[51] Int. Cl.[6] .................................................. G11B 33/02
[52] U.S. Cl. ............................................................ 360/137
[58] Field of Search .......................... 360/137, 1; 369/31, 369/63, 64, 292; 362/86, 253, 457, 458; 446/227, 297, 302, 397, 485; 5/93.1, 101, 281, 658

[56] References Cited

U.S. PATENT DOCUMENTS

| | | | |
|---|---|---|---|
| 3,840,924 | 10/1974 | Hamilton | 5/317 R |
| 4,521,205 | 6/1985 | Spector | 446/302 |
| 4,640,034 | 2/1987 | Zisholtz | 446/227 X |
| 4,670,820 | 6/1987 | Eddins et al. | 362/86 |
| 4,793,010 | 12/1988 | Gross et al. | 5/109 |
| 4,881,285 | 11/1989 | Zeeb | 5/103 |
| 5,148,561 | 9/1992 | Tharalson et al. | 5/95 |
| 5,307,051 | 4/1994 | Sedlmayr | 446/227 X |

*Primary Examiner*—William R. Korzuch

[57] ABSTRACT

A cassette player apparatus for use on a baby crib including a cassette player generally encased in a manually-portable housing; a mounting bracket removably securable to a crib rail; a coupling mechanism for removably coupling the housing of the cassette player to the mounting bracket; and a locking mechanism for locking the housing of the cassette player to the mounting bracket.

1 Claim, 4 Drawing Sheets

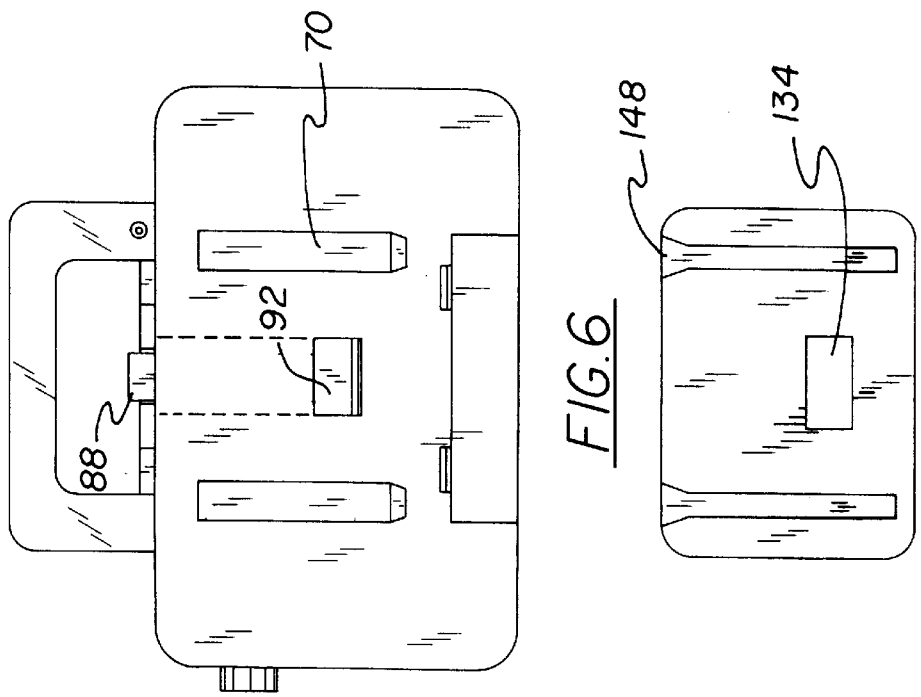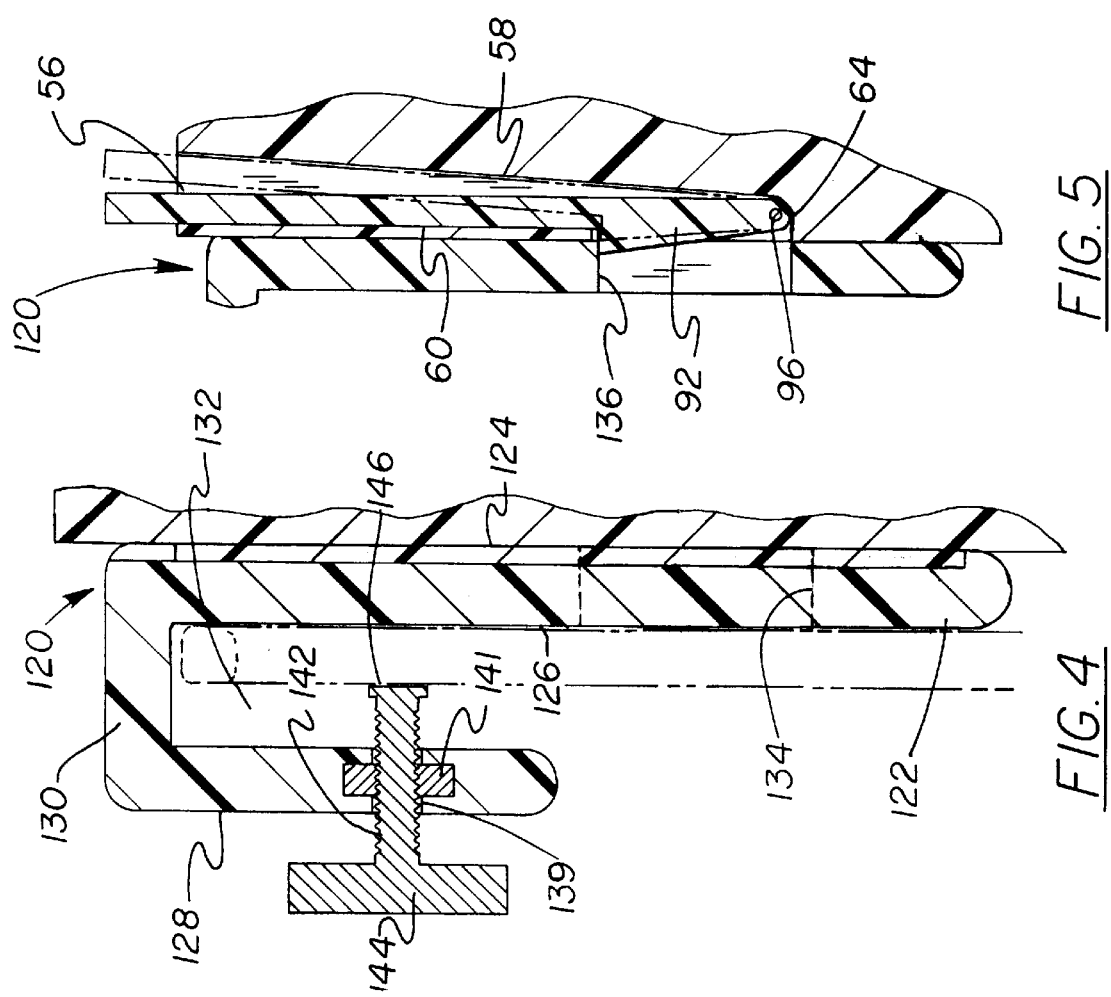

CASSETTE PLAYER APPARATUS FOR USE ON A BABY CRIB

BACKGROUND OF THE INVENTION

1. Field of the Invention

The present invention relates to a cassette player apparatus for use on a baby crib and more particularly pertains to allowing a cassette player to be hung from a baby crib and easily removed therefrom for use at another location with a cassette player apparatus for use on a baby crib.

2. Description of the Prior Art

The use of cassette players with holders is known in the prior art. More specifically, cassette players with holders heretofore devised and utilized for the purpose of holding a cassette player at a desired location for use are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 262,216 to Yoshimoto discloses a bed headboard mountable clock radio or similar article. U.S. Pat. Des. No. 277,630 to Olson et al. discloses a stereo headrest for dental chairs. U.S. Pat. No. 3,621,155 to Pruitt discloses a stereo pillow. U.S. Pat. No. 3,840,924 to Hamilton discloses a combination clock, bed lamp, radio and tape player. U.S. Pat. No. 3,946,316 to Hough discloses a radio-pillow device. U.S. Pat. No. 5,201,002 to Dahlem discloses a stereo sound pillow and method of making.

While these devices fulfill their respective, particular objective and requirements, the aforementioned patents do not describe a cassette player apparatus for use on a baby crib that allows a cassette player to be removably coupled a crib or bed rail and that can also be used as a night light for a child.

In this respect, the cassette player apparatus for use on a baby crib according to the present invention substantially departs from the conventional concepts and designs of the prior art, and in doing so provides an apparatus primarily developed for the purpose of allowing a cassette player to be hung from a baby crib and easily removed therefrom for use at another location.

Therefore, it can be appreciated that there exists a continuing need for new and improved cassette player apparatus for use on a baby crib which can be used for allowing a cassette player to be hung from a baby crib and easily removed therefrom for use at another location. In this regard, the present invention substantially fulfills this need.

SUMMARY OF THE INVENTION

In the view of the foregoing disadvantages inherent in the known types of cassette players with holders now present in the prior art, the present invention provides an improved cassette player apparatus for use on a baby crib. As such, the general purpose of the present invention, which will be described subsequently in greater detail, is to provide a new and improved cassette player apparatus for use on a baby crib and method which has all the advantages of the prior art and none of the disadvantages.

To attain this, the present invention essentially comprises, in combination, a cassette player. The cassette player includes a cassette receiving mechanism for receiving in operative engagement therewith a standard-sized cassette tape, a drive mechanism secured to the cassette receiving mechanism for driving a standard-sized cassette tape emplaced therein, and a magnetic head mechanism secured within the cassette receiving mechanism for bearing against a cassette tape disposed therein. The cassette player also includes a tape control mechanism in operative engagement with the cassette receiving mechanism, the drive mechanism, and the magnetic head mechanism for allowing a standard-sized cassette tape engaged by the drive mechanism to be fast forwarded, rewound, played, recorded, stopped, and ejected. A volume-controllable speaker mechanism is provided and coupled to the tape control mechanism for allowing transmission of audible signals when a standard-sized cassette tape is being played. A power source mechanism is coupled to the drive mechanism, the magnetic head mechanism, the tape control mechanism, and the speaker mechanism, the volume control mechanism, and the switch mechanism and is used for providing electrical energy for their operation.

The cassette player includes a rigid and manually-portable housing encasing the cassette receiving mechanism, the magnetic head mechanism, the tape control mechanism, the volume-controllable speaker mechanism, and the power source mechanism. The housing has a top surface, a back surface, a centrally positioned elongated vertical slot with a rectangular cross-section extended downwards into the housing from a central portion of the top surface and at a location proximal to the back surface to thereby create an inboard guiding surface, an outboard guiding surface, a pair of opposed side guiding edges therebetween, and a lower end edge. The housing further has a lateral pin hole formed on each guiding edge at a location proximal to the end edge, a rectangular lateral aperture formed on a central portion of the back surface in communication with the slot near the end edge, and a pair of spaced and elongated tenons integral with and extended downward along the back surface on each side of the aperture.

Furthermore, a hollow and generally transparent handle is coupled to the top surface of the housing of the cassette player. A lamp disposed within the handle. A manually-operated switch mechanism is coupled to the handle and to the lamp and the power source mechanism and allows the lamp to be selectively illuminated.

Lastly, the cassette player includes a rigid elongated locking lever. The locking lever has a front side, a back side, a rectangular planar upper extent terminated at a flat top end, and a bottom end having a tapered portion extended outwards from the back side to define a hook with an upwardly facing abutment edge. A bore is extended through a lower extent of the hook. Furthermore, an elongated lateral orifice formed on the front side of the locking level and is in communication with the bore. The orifice defines an upwardly facing seating surface. A seating hole is formed on the seating surface, and a helical spring is disposed within the orifice and is aligned along a common axis with the bore. The spring has an inboard end secured within the seating hole and an outboard end extending outwards from the orifice. The locking lever is disposed within the slot of the housing with the top end extended upwards therefrom. A spring-loaded pin is included. The spring-loaded pin is extended through the bore and spring of the locking lever and secured within the pin holes of the housing. The outboard end of the spring is urged against the inboard guiding surface of the slot of the housing, thereby biasing the hook outwards through the aperture of the housing. The hook is retracted within the aperture of the housing when the top end of the locking level is pressed inwards toward the inboard guiding surface.

The present invention also includes a rigid mounting bracket of a generally inverted J-shaped cross-section. The mounting bracket is formed of a long front plate with a front surface and a back surface, a short rear plate, and a horizontal cross plate extended therebetween to thereby define a holding space for receiving a crib rail. The mounting bracket includes a rectangular notch extended through the front plate to thereby create a periphery with an upper abutment edge.

In addition, the mounting bracket includes a pair of lateral elongated oblong slots formed on the rear plate, an inwardly threaded nut slidably secured within each slot, and a thumbscrew threadedly disposed with each nut. Each thumbscrew is laterally adjustable within the respective slot and is tightenable for clamping onto a crib rail within the holding space. The mounting bracket additionally includes a pair of elongated mortises that are integral with and extended downwards along its front surface.

The tenons on the cassette recorder are slidably mateable with the mortises on the mounting bracket to create a pair of dovetail joints that hold the cassette player to the mounting bracket. The abutment edge of the hook of the locking lever is placed in contact with the abutment edge of the aperture on the mounting bracket, thereby locking the cassette player and the mounting bracket in place. Inward pressure on the locking lever causes contact between the associated abutment edges of the mounting plate and locking lever to be broken, thereby allowing the cassette player to be removed from the mounting bracket.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cassette player apparatus for use on a baby crib which has all the advantages of the prior art cassette players with holders and none of the disadvantages.

It is another object of the present invention to provide a new and improved cassette player apparatus for use on a baby crib which may be easily and efficiently manufactured and marketed.

It is a further object of the present invention to provide a new and improved cassette player apparatus for use on a baby crib which is of durable and reliable construction.

An even further object of the present invention is to provide a new and improved cassette player apparatus for use on a baby crib which is susceptible of a low cost of manufacture with regard to both materials and labor, and which accordingly is then susceptible of low prices of sale to the consuming public, thereby making such a cassette player apparatus for use on a baby crib economically available to the buying public.

Still yet another object of the present invention is to provide a new and improved cassette player apparatus for use on a baby crib which provides in the apparatuses and methods of the prior art some of the advantages thereof, while simultaneously overcoming some of the disadvantages normally associated therewith.

Even still another object of the present invention is to provide a new and improved cassette player apparatus for use on a baby crib for allowing a cassette player to be hung from a baby crib and easily removed therefrom for use at another location.

Lastly, it is an object of the present invention to provide a new and improved cassette player apparatus for use on a baby crib comprising a cassette player generally encased in a manually-portable housing; a mounting bracket removably securable to a crib rail; a coupling mechanism for removably coupling the housing of the cassette player to the mounting bracket; and a locking mechanism for locking the housing of the cassette player to the mounting bracket.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross-sectional view of the housing and mounting bracket of the present invention. While not shown in FIG. 3, the crib rail is shown in FIG. 4 for depicting the interconnection thereof with the mounting bracket.

FIG. 5 is a cross-sectional view of the mounting bracket and back surface of the housing taken along the line 5—5 of FIG. 3. Such Figure FIG. 6 is a rear perspective view of the back side of the cassette player.

FIG. 7 is a side-elevational view of the front side of the mounting bracket illustrating the mortises.

The same reference numerals refer to the same parts through the various Figures.

DESCRIPTION OF THE PREFERRED EMBODIMENT

Figure 1:
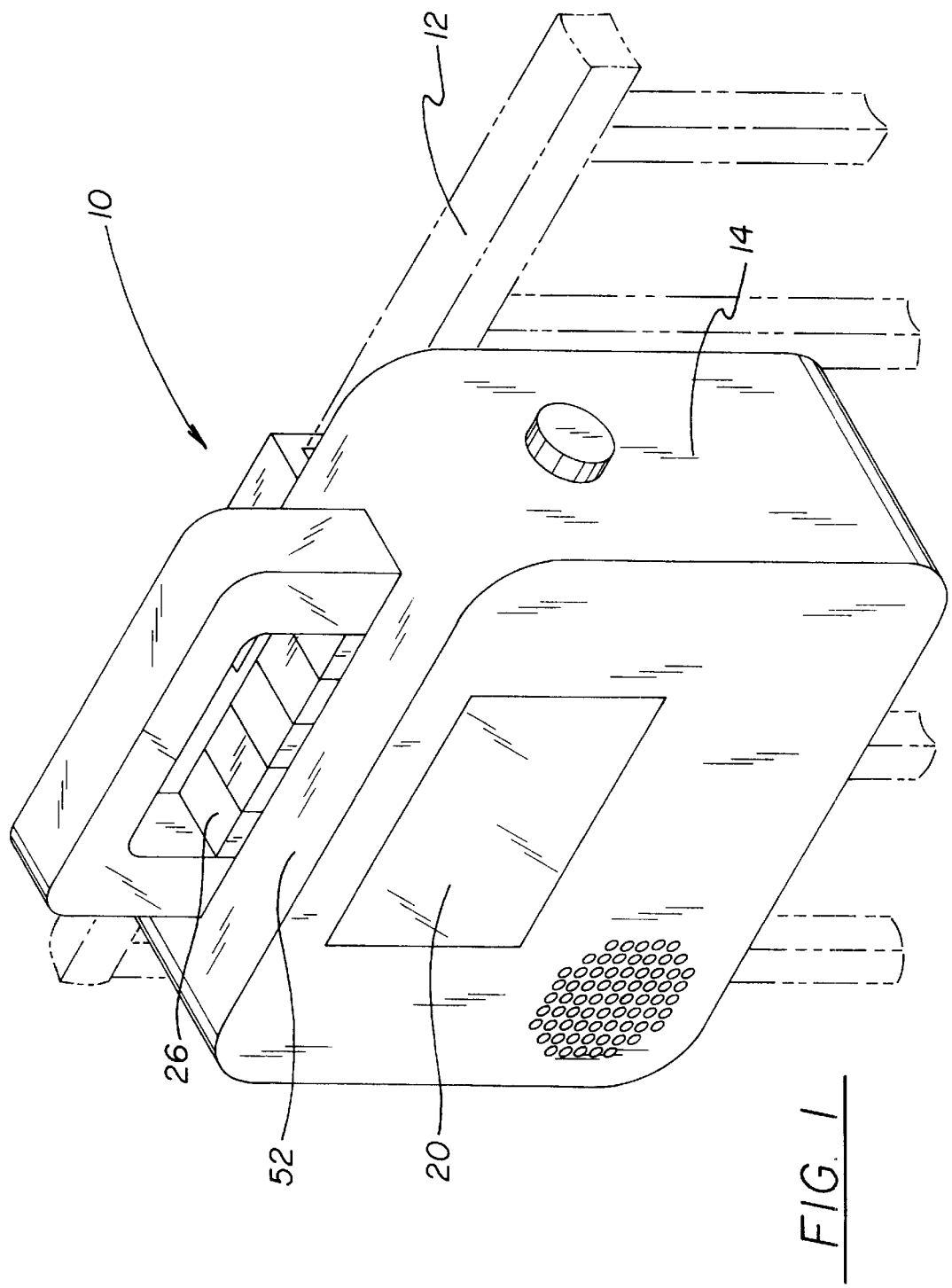
FIG. 1 is a perspective view of the preferred embodiment constructed in accordance with the principles of the present invention secured to a rail of a baby crib.
Figure 2:
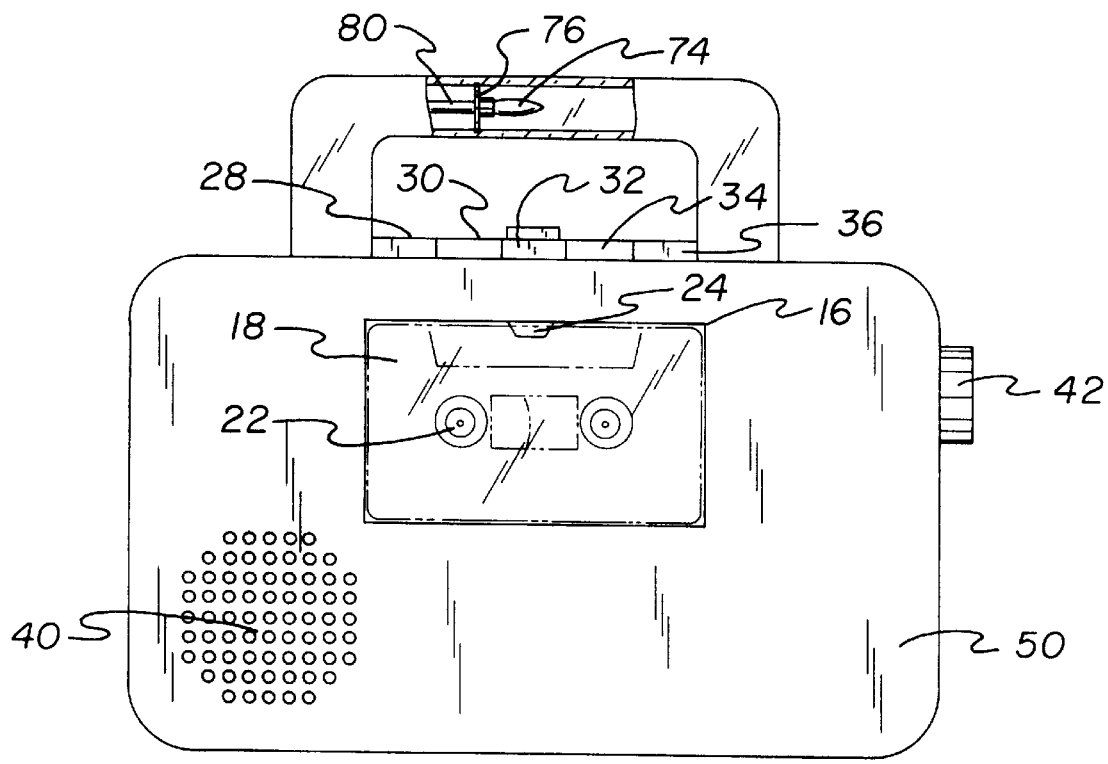
FIG. 2 is a front perspective view of the cassette recorder of the present invention.

With reference now to the drawings, and in particular, to FIGS. 1–9 thereof, the preferred embodiment of the new and improved cassette player apparatus for use on a baby crib embodying the principles and concepts of the present invention and generally designated by the reference number 10 will be described.

The preferred embodiment of the present invention comprises a plurality of components. In their broadest context, such components include a cassette player and mounting bracket. Such components are individually configured and correlated with respect to each other to allow the present invention to be hung on a baby crib or bed rail 12 for use. Note FIGS. 1 & 4.

Specifically, the present invention includes a cassette player 14. The cassette player includes a cassette receiving mechanism 16 for receiving in operative engagement a standard-sized cassette tape 18. The cassette receiving mechanism includes a seat upon which the cassette tape is placed in contact and is enclosed therein through use of a door 20. A drive mechanism 22 is secured to the cassette receiving mechanism 16. The drive mechanism is used for engaging and driving a standard-sized cassette tape emplaced within the cassette receiving mechanism. The drive mechanism is formed of a capstan and pinch roller assembly that is used in conventional cassette players. A magnetic head mechanism 24 is also secured within the cassette receiving mechanism. The magnetic head mechanism bears against a cassette tape disposed therein for playing and recording purposes. The magnetic head mechanism is formed of conventional read and write heads. Note FIGS. 1–3.

To allow control a standard-sized cassette tape, an electromechanical tape control mechanism 26 is included. The tape control mechanism is in operative engagement with the cassette receiving mechanism 16, the drive mechanism 22, and the magnetic head mechanism 24. The tape control mechanism allows a standard-sized cassette engaged by the drive means to be manually fast forwarded with a fast forward button 28, rewound with a rewind button 30, played with a play button 32, recorded upon with a record button 34, and stopped and ejected with a stop/eject button 36. Note FIG. 2.

In addition, the cassette player includes a speaker mechanism 40 that is coupled to the tape control mechanism 26. The speaker mechanism allows transmission of audible signals to a remote location when a standard-sized cassette tape is being played. A volume control knob 42 is used for controlling the volume of signals generated from the speaker mechanism. Note FIG. 2.

A power source mechanism formed of a plurality of batteries 44 is electrically coupled to the drive mechanism 22, the magnetic head mechanism 24, the tape control mechanism 26, and the volume-controllable speaker mechanism 40. The power source mechanism provides electrical energy for operation of the cassette player. The batteries 44 are secured within a battery compartment 46 and enclosed therein with a door 48. Note FIGS. 3 & 8.

In addition, a rigid plastic housing 50 encases the cassette receiving mechanism 16, the magnetic head mechanism 24, the tape control mechanism 26, the volume-controllable speaker mechanism 40, and the power source mechanism 44. The housing is of a size that allows the cassette player to be manually portable. The housing has a top surface 52 and a generally vertical back surface 54. A centrally positioned and elongated vertical slot 56 with a rectangular cross-section is formed in the housing. The slot is extended downwards into the housing from a central portion of the top surface 52 at a location proximal to the back surface 54. The slot thereby creates an inboard guiding surface 58, an outboard guiding surface 60, and a pair of opposed side guiding edges 62 extended therebetween. The slot is terminated at a lower end edge 64. Note FIGS. 1, 2 & 5.

A lateral pin hole 66 is formed on each side guiding edge at a location proximal to the end edge 64. The pin holes 66 are aligned about a common axis of symmetry. A rectangular and lateral aperture 68 is formed on a central portion of the back surface 54 and placed in communication with the slot 56 at a location near the end edge. Furthermore, the housing includes a pair of spaced and elongated tenons 70. The tenons are integral with and extended downward along the back surface 54 of each side of the aperture 68.

The housing is holdable through use of a hollow and generally transparent inverted U-shaped plastic handle 72. The handle is coupled to the top surface 52 of the housing. In addition, a lamp is disposed within the handle 74 and secured therein with a socket 76. The lamp is operable through use of a manual switch 78. The switch is coupled to the handle and to the lamp with a wire 80. The switch allows the lamp to receive electrical energy from the power source mechanism 44 for allowing the lamp to be selectively illuminated. The lamp of the present invention can thus function as a night light when secured onto a rail of a child's bed or of a crib. The handle may bear surface ornamentation be colored to provide for an aesthetic effect. Note FIGS. 1 & 2.

Figure 8:
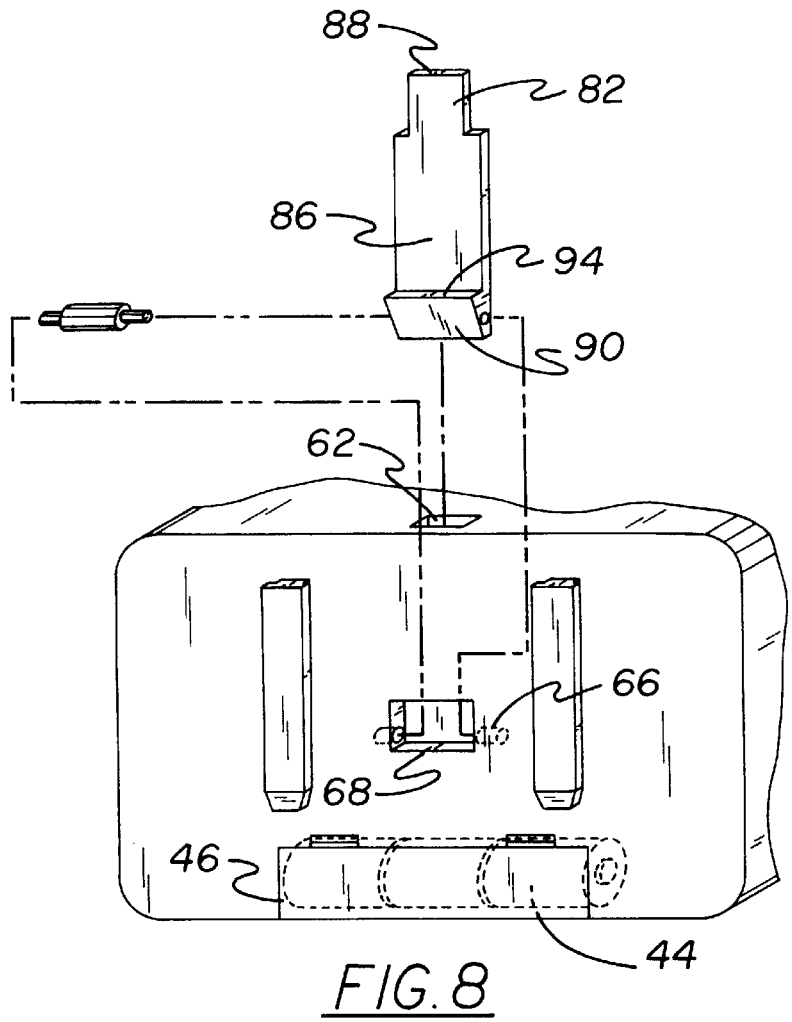
FIG. 8 is a fragmentary exploded rear view of the cassette player illustrating the locking lever.
Figure 9:
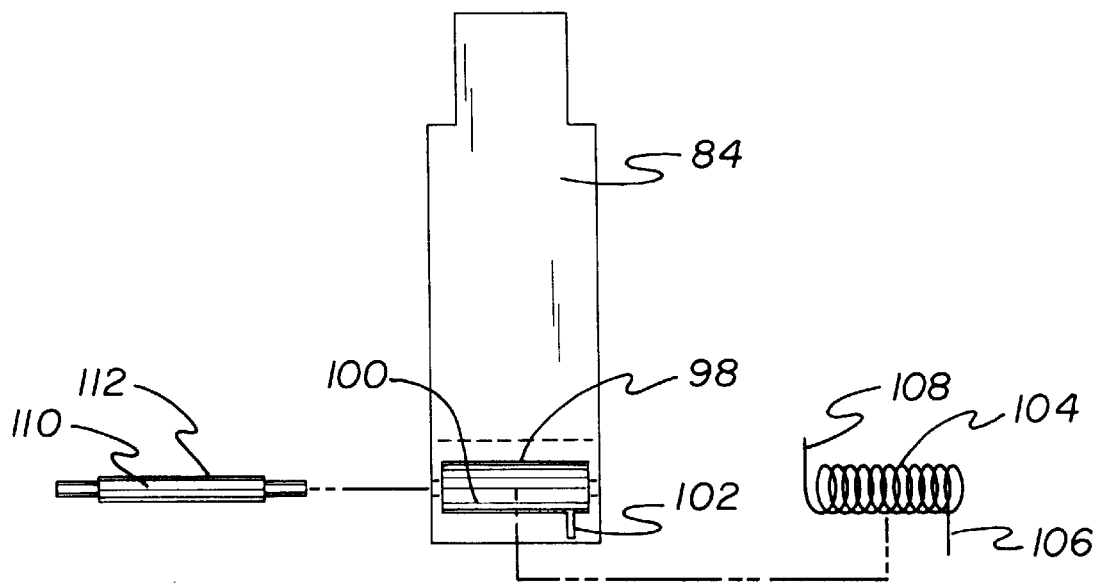
FIG. 9 is an exploded perspective view of the locking lever of the present invention.

Lastly, the housing includes a plastic rigid and elongated locking lever 82, as shown in FIGS. 5, 8, & 9. The locking lever has an inboard or front side 84, an outboard or back side 86, and a planar upper extent that is terminated at a flat top end 88. The lever also has a bottom end that has a tapered portion 90 with a generally triangular cross-section extended outwards from the back side. The tapered portion thus defines a hook 92 that has an upwardly facing flat abutment edge 94. A lateral bore 96 is extended through a lower extent of the hook. In addition, the locking lever has an elongated lateral orifice 98 formed on the front side 84 and placed in communication with the bore 96. The orifice defines an frontwardly facing seating surface 100. A seating hole 102 is formed on the seating surface. A helical metal spring 104 is included and disposed within the orifice. The spring is aligned along a common axis with the bore 96. The spring has an inboard end 106 that is secured within the seating hole 102 and an outboard end 108 that is extended outwards from the orifice 98. The locking lever is disposed within the slot 56 of the housing such that the top end 88 is extended upwards above the top surface.

The locking lever further includes a spring-loaded metal pin 110 that has an extended rigid central portion 112. The pin is extended through the bore 96 and spring 104 and has its ends secured within the pin holes 66 of the housing 50. The outboard end 108 of the spring is urged against the inboard guiding surface 58 of the slot of the housing, thereby biasing the hook 92 outwards through the aperture 68 of the housing. The hook is retracted within the aperture of the housing when the top end 88 of the locking lever is pressed inwards toward the inboard guiding surface. See FIG. 9.

Furthermore, the present invention includes a rigid plastic mounting bracket 120. The mounting bracket has a generally inverted J-shaped cross-section. The mounting bracket is formed of a long front plate 122 with a front surface 124 and a back surface 126, a short rear plate 128, and a horizontal cross-plate 130 extended therebetween. The plates in combination define a holding space 132 for receiving a crib or bed rail 12. The mounting bracket also includes a rectangular notch 134 that is extended through the front plate to thereby create a periphery with an upper abutment edge 136. Note FIG. 4.

Figure 3:
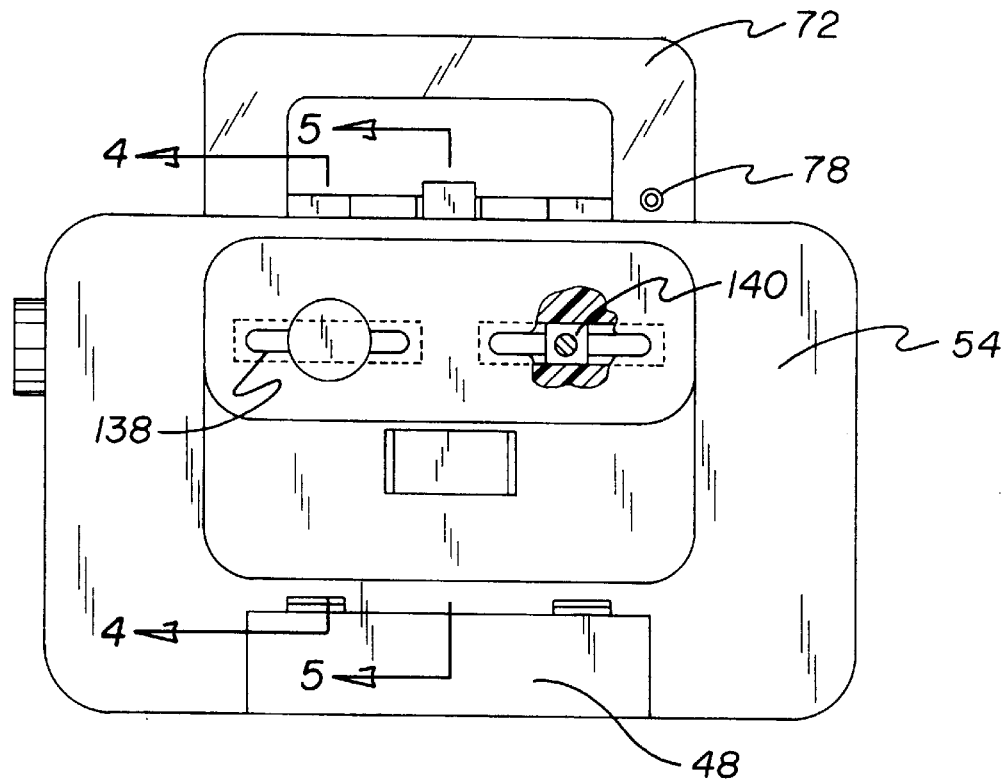
FIG. 3 is a rear perspective view of the cassette recorder and mounting bracket of the present invention. In such Figure, the crib rail has been omitted for the purposes of clarity.

The mounting bracket also has a pair of lateral and elongated oblong slots 138 formed on the rear plate. As shown in FIG. 3, each slot has an inwardly extending peripheral lip 139 formed in coplanar relationship with a front and rear surface of the rear plate thereby defining the groove 141. An inwardly threaded square nut 140 is slidably secured within each slot through the use of a groove 141. A thumbscrew 142 is threadedly disposed within each nut. Each thumbscrew and nut are laterally adjustable within its respective slot and the thumbscrew is tightenable through actuation of handle 144 for allowing its tip end 146 to clamp onto a crib rail 12 within the holding space. Note FIGS. 4.

Furthermore, the mounting bracket has a pair of elongated mortises 148 that are integral with and extended downwards along the front surface 124. The mortises are positioned such that they are slidably mateable with the tenons 70 on the cassette recorder. When coupled together, the tenons and mortises create a pair of unillustrated dovetail joints. The dovetail joints are used to hold the cassette player to the mounting bracket. The abutment edge 94 of the hook of the locking lever is placed in contact with the abutment edge 136 of the aperture on the mounting bracket to thereby lock the cassette player 14 and the mounting bracket 120 together in place. Inward pressure on the locking lever causes contact between the associated abutment edges to be broken thereby allowing the cassette player to be unlocked from the mounting bracket. The cassette player then can be removed from the mounting bracket by pulling it upwards. Note FIGS. 4–7.

The present invention is a specially designed cassette player which can be installed on a baby's crib to provide soothing music or stories for a baby's quiet, play, or nap times. The present invention features child-safe construction. The housing of the present invention features rounded corners that are safe for use in a baby's bed. The present invention can be securely attached to the side of a crib or a child's bed with its adjustable mounting bracket. The mounting bracket is designed to allow it to be quickly and easily installed on any style crib or bed rail. A child proof latching mechanism permits an adult to remove the cassette player from the mounting bracket so it can be used elsewhere. Babies and toddlers will be unable to manipulate the level, thereby eliminating the chance of the cassette player being removed and falling on and hurting the child. The housing of the present invention is formed of a plastic material with bright appealing colors. Furthermore, indicia such as a sun, moon, or stars may be emplaced upon the cassette player or mounting bracket. In addition, the handle can be embossed with a rainbow pattern for a decorative effect. The lamp in the handle may function as a night light. The cassette player is battery powered or receives power for operation through use of a conventional power cord.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A cassette player apparatus for use on a baby crib comprising, in combination:

a cassette player comprising:
cassette receiving means for receiving in operative engagement therewith a cassette tape,
drive means secured to the cassette receiving means for driving the cassette tape emplaced therein,
magnetic head means secured within the cassette receiving means for bearing against the cassette tape disposed therein,
tape control means in operative engagement with the cassette receiving means, the drive means, and the magnetic head means for allowing the cassette tape engaged by the drive means to be fast-forwarded, rewound, played, recorded, stopped, and ejected,
volume-controllable speaker means coupled to the tape control means for allowing transmission of audible signals when the cassette tape is being played,
power source means coupled to the drive means, the magnetic head means, the tape control means, and the volume-controllable speaker means for providing electrical energy for their operation,
a rigid and manually-portable housing encasing the cassette receiving means, the driving means, the magnetic head means, the tape control means, the volume-controllable speaker means, and the power source means, the housing having a top surface and a back surface, a centrally positioned elongated vertical slot with a rectangular cross-section extended downwards into the housing from a central portion of the top surface and at a location proximal to the back surface to thereby create an inboard guiding surface, an outboard guiding surface, a pair of opposed side guiding edges therebetween, and a lower end edge, the housing further having a lateral pin hole formed on each side guiding edge at a location proximal to the end edge, a rectangular lateral aperture formed on a central portion of the back surface in communication with the slot near the end edge, and a pair of spaced and elongated tenons integral with and extended downward along the back surface on each side of the aperture,
a hollow and transparent handle coupled to the top surface of the housing, a lamp disposed within the handle, manually-operated switch means coupled to the handle and to the lamp and the power source means for allowing the lamp to be selectively illuminated, and a rigid elongated locking layer having a front side, a back side, a rectangular planar upper extent terminated at a flat top end, a bottom end having a tapered portion extended outwards from the back side to define a hook with an upwardly facing abutment edge, a bore extended through a lower extent of the hook, an elongated lateral orifice formed on the front side in communication with the bore and defining an upwardly facing seating surface, a seating hole formed on the seating surface, and a helical spring disposed within the orifice and aligned along a common axis with the bore and with the spring having an inboard end secured within the seating hole and an outboard end extended outwards from the orifice the locking lever disposed within the slot of the housing with the top end extended upwards therefrom, and with the locking lever further having a spring-loaded pin extended through the bore and spring and secured within the pin holes of the housing, and with the outboard end of the spring being urged against the inboard guiding surface of the slot of the housing, thereby biasing the hook outwards through the aperture of the housing, and with the hook being retracted within the aperture of the housing when the top end of the locking lever is pressed inwards toward the inboard guiding surface; and a rigid mounting bracket of a generally inverted J-shaped cross-section formed of a long front plate with a front surface and a back surface, a short rear plate, and a horizontal cross plate extended therebetween to thereby define a holding space for receiving a crib rail, the mounting bracket further having a rectangular notch extended through the front plate to thereby create a periphery with an upper abutment edge, a pair of lateral elongated oblong slots formed on the rear plate, an inwardly threaded nut slidably secured within each slot, and a thumbscrew threadedly disposed with each nut and being laterally adjustable within the slot and tightenable for clamping onto a crib rail within the holding space, the mounting bracket additionally having a pair of elongated mortises integral with and extended downwards along the front surface thereof, and wherein the tenons on the cassette recorder slidably mate with the mortises on the mounting bracket to create a pair of dovetail joints that hold the cassette player to the mounting bracket, and wherein the abutment edge of the hook of the locking lever is placed in contact with the upper abutment edge of the aperture on the mounting bracket, thereby locking the cassette player and the mounting bracket in place, and wherein inward pressure on the locking lever toward the inboard guiding surface of the slot in the housing causes contact between the associated abutment edges to be broken, thereby allowing the cassette player to be removed from the mounting bracket.

* * * * *